(No Model.)  2 Sheets—Sheet 1.
H. W. CHURCH.
WOOL WASHING MACHINE.
No. 244,854. Patented July 26, 1881.
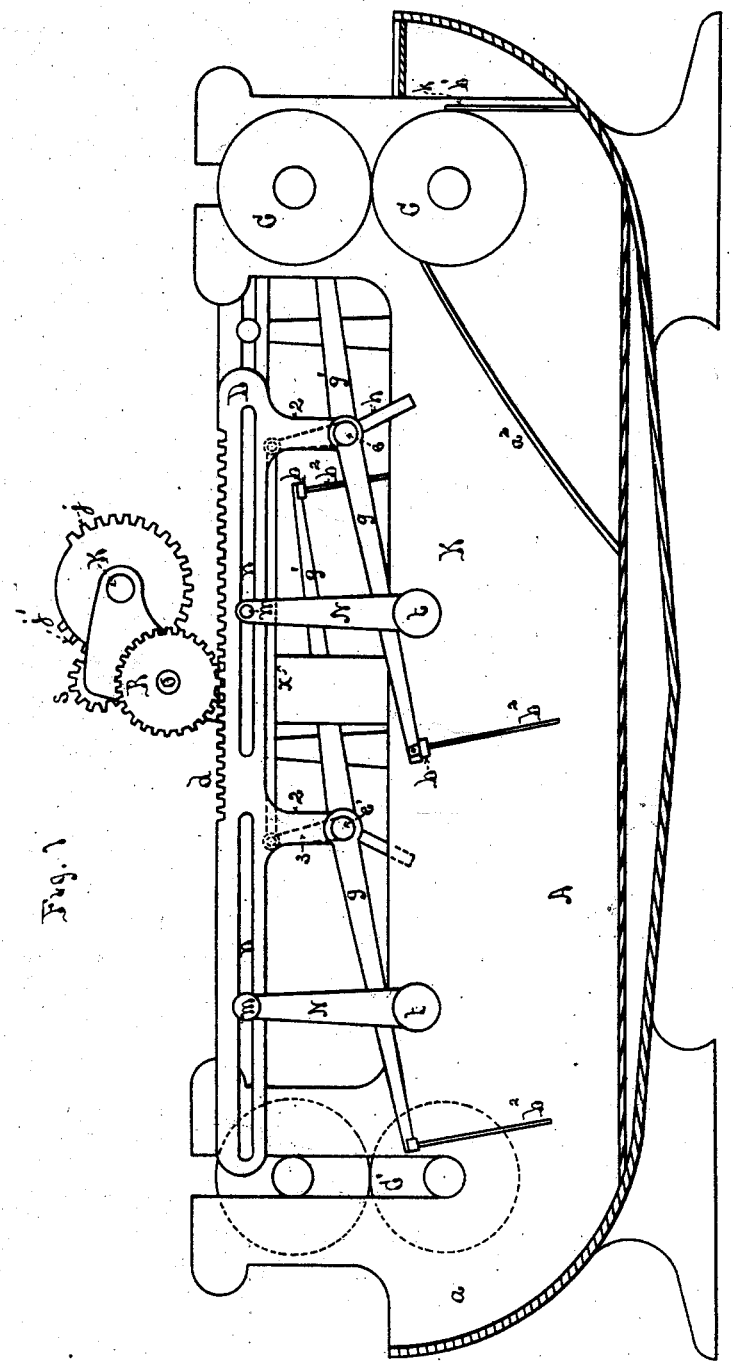
Witnesses
Inventor
Henry W. Church
N. PETERS. Photo-Lithographer. Washington, D. C.

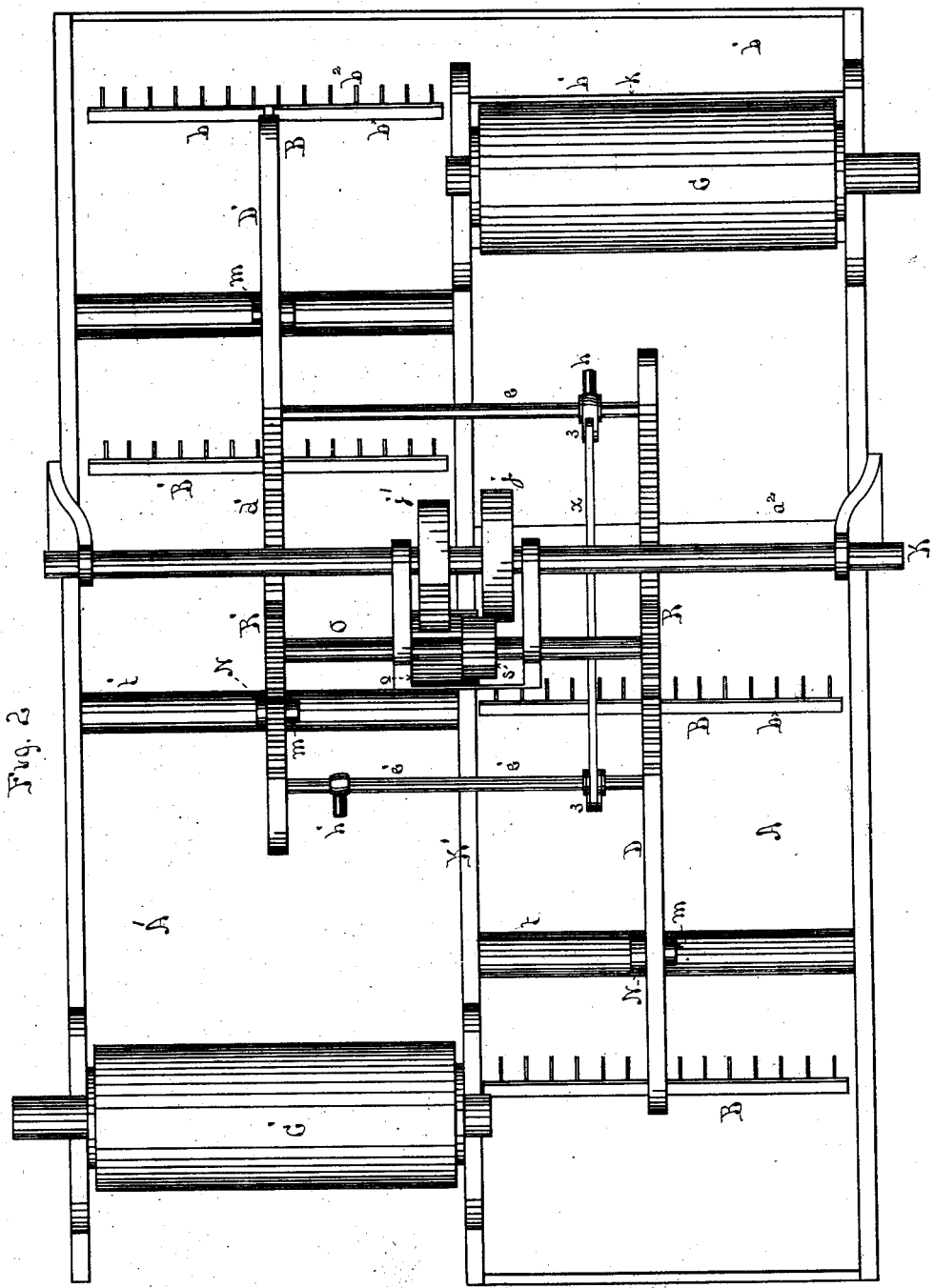

UNITED STATES PATENT OFFICE.

HENRY W. CHURCH, OF GRANITEVILLE, MASSACHUSETTS, ASSIGNOR TO C. G. SARGENT'S SONS, OF SAME PLACE.

WOOL-WASHING MACHINE.

SPECIFICATION forming part of Letters Patent No. 244,854, dated July 26, 1881.

Application filed December 4, 1880. (No model.)

*To all whom it may concern:*

Be it known that I, HENRY W. CHURCH, of Graniteville, county of Middlesex, and State of Massachusetts, have invented a new and useful Wool-Washing Machine, of which the following is a specification.

My invention relates to machines in which the wool is placed in a tank or bowl containing a washing or scouring liquid, and in which it is stirred by rakes moved by suitable mechanism driven by power.

The object of my device is to combine two bowls in such manner that the rakes operating in one shall be in use at a time when the rakes in the other are on their backward movement out of use, in order that two machines may be driven with but little addition to the power now required to drive one, and to provide a suitable connecting mechanism to so operate the rakes, to arrange the tanks so that the wool fed into one of them may be washed through both, and, after having the liquid squeezed from it, be discharged within the reach of the operator feeding the machine, and to provide a mechanism which shall move each of its rakes parallel with the surface of the liquid in the tank while drawing the wool through it, and while returning them above it to again move the wool in it, and to withdraw its rakes from and re-enter them into the wool in the liquid by moving them in a direction substantially perpendicular to the surface of the fluid in the tank or bowl. I attain these objects by the mechanism illustrated in the accompanying drawings, in which—

Figure 1 is a side elevation, with the side of the bowl broken away. Fig. 2 is a top-plan view.

A A' are the bowls or tanks in which the scouring-liquor is placed, separated from one another by the dividing-walls K' k, the wall K' separating the main part of the tank, and the wall k separating the tank A from the trough like extension b', which is part of tank A'.

B B' are the rakes which move the wool in the bowls. These rakes consist of the head b, staff g, and tines b².

C C' are the squeeze-rolls.

D D' are the sliding rack-frames, which carry the rock-shafts e e'. Attached to these rock-shafts are the rake-staffs g g' and the shifting-levers h h'.

K is the main or driving shaft. j j' are segmental gears placed on the shaft K, which alternately engage the one with pinion o and the other with pinion s, which last is in constant engagement with the first. Pinion o is upon shaft O, on which are placed the wheels R R', which engage with the racks d d' formed on the top of the rack-frames D D'. These frames travel on guide-pins m m, which pass through the slots n n, and are attached to the supports N, connected with the frame of the machine by cross-bars t t'. On the lower part of the frames D D' are the hangers 2 2, in which the rock-shafts oscillate. Attached to these rock-shafts are arms 3 3, (shown in dotted lines in Fig. 1,) whose ends are connected by the connecting-bar x.

The operation of the machine is as follows: The wool, being fed into the bowl at a, will be taken by the rakes B B and moved toward the squeeze-rolls C C. When the movement of the rakes B B toward the rolls C is about to be completed the shifting-lever h' comes in contact with the cross-bar t', and the further movement of the frame toward the rolls C, carrying the rock-shaft e' over and beyond the bar t, causes the rock-shaft to be oscillated with a right-hand movement, and lifts up the rakes B B and depresses the rakes B' B', at which moment the gear j' goes out of engagement with the pinion o and the gear j comes into engagement with the intermediate pinion, s, by which means the rotation of the shaft O is reversed, and the wheels R R', moving with the shaft O, reverse the movement of the rack-frames, carrying back the rakes B, suspended in the air, toward the end a of the bowl A, just before reaching which the lever h comes in contact with the cross-bar t', and the rakes B B are thrown down, driving their tines perpendicularly, or nearly so, into the wool in the tank, and the segmental gear j', engaging with the pinion o, immediately after the segmental gear j has gone out of engagement with the pinion s, again moves the rack-frames and rakes back toward the rolls C.

As the staffs of rakes B' are attached to the opposite sides of the same rock-shafts as are the staffs of rakes B, the rocking of the shafts as described, to depress the rakes B, elevates the rakes B', and the opposite movement to bring rakes B' into operative position in the tank elevates rakes B from their lower line of movement in the tank to the position above the fluid in the tank, in which they can be carried back away from the squeeze-rolls, to again be depressed into the tank.

As the rake-staffs in the one bowl are attached to the opposite side of the rock-shafts from those that operate in the other, the weight of the rakes in the one balances those in the other, and consequently no mechanism is required to retain them in any position in which the levers $h$ and $h'$ put them.

As the rakes over one bowl are moving the wool in the liquor while those in the other are passing back above its surface, the machinery required to drive them is not subject to sudden strains caused by the resistance to the rakes moving the wool in the liquor all at one time, and then withdrawing them to return to the beginning of their stroke all at another, and the power required to drive the machine is much less than to drive two separate machines each consisting of one bowl of similar capacity to one of the bowls of this machine, because the power necessary to drive the two machines is the amount necessary to overcome the greatest resistance both can offer when working to their greatest capacity, as they may and often do require the maximum amount for each at the same instant, and if it be undertaken to run them with less than the aggregate of their maximum requirements, then the machinery is liable to stop at any moment from being overloaded, while with my machine the maximum power required to move the wool in one bowl always is called for when the minimum power required to operate the rakes is necessary.

When the wool fed into the tank A at $a$ is moved toward the squeeze-rolls C it is carried up the inclined table $a^2$ by a carrier of any of the well-known kinds, which is not therefore shown, as it forms no part of this invention. When the wool passes through the squeeze-rolls C it falls into the trough-like extension $b'$, which is part of tank A', and therefore the wool can be floated in the liquid standing in the trough into the tank A', when it is seized by the rakes B' and carried toward the squeeze-rolls C', passing out from which it falls by the side of the operator feeding the machine, who, if he desires, can again feed it into the bowl A and let it again pass through the machine. He may thus successively feed the wool in small lots or batches through the machine several times without being compelled to carry the wool from one end of the machine to the other, or having it at any time idle, and he may thus always be enabled, without moving from his position, to see how perfectly the machine is doing its work; and if any wool comes out of the machine not sufficiently cleansed he can, without lifting or carrying it, return it to the machine, while the perfectly-cleansed wool, when examined, can be pushed off the table out of the way, all of which the operator can accomplish without leaving the feed-table. It is therefore not necessary to soak all the wool until the dirtiest and gummiest masses will pass out cleansed thoroughly, but only until the gum and dirt are loosened in the greater portion, and therefore the wool can be passed through the machine more rapidly.

Another advantage which my machine has over machines having a tank divided into compartments, from one to the other of which the wool moves in and with the fluid, is that the scouring and cleansing liquid in the two tanks may be of different strength, and the wool, instead of floating around in and with the same fluid in different compartments, retaining the dirt it had in its mass and the liquid it becomes saturated with until finally taken from the machine, has, after one saturation and soaking, the fluid squeezed out before passing to the second tank. As this fluid is squeezed out it carries a considerable part of the dirt with it and crowds the fibers against one another, so as to greatly loosen the gum and dirt remaining in the wool, and put it in condition so that as it is soaked and washed on its passage through the second tank it will be in a condition to part with a much greater quantity of the gum and dirt than would be the case had it been returned saturated with the fluid it first received. The rakes B B' move their tines in four movements, describing a figure two of whose sides are parallel with the surface of the fluid in the tank, and the other two substantially perpendicular to it and parallel to each other. Therefore a minimum amount of power is required to move them, as they project their tines almost perpendicularly into the wool in the liquid, and withdraw them in the same manner without bearing down or lifting upon it by contact with the sides of the tines, as do machines carrying their rakes around in the axes of circles or ellipses, and sweeping the ends of the tines farther backward and forward than their other portions, thus saving the power wasted in other machines in lifting and depressing large saturated masses of fiber in the scouring-liquid by reason of such useless movements.

What I claim as new and of my invention is—

1. The combination of the bowl A, squeeze-rolls C C, bowl A', and squeeze-rolls C' C' in such manner that the wool passing out of the tank A between the rolls C C shall fall into the bowl A' at its end farthest from the rolls C' C', and the wool falling out from the rolls C' C' shall fall near the receiving end of the tank A, substantially as described.

2. The combination of the bowls A A', the sliding rack-frame D D', the rock-shafts $e\ e'$, provided with the rakes B B', the bars $t\ t$, and the levers $h\ h'$, substantially as described.

3. In a wool-washer having two separate bowls in which the wool moves in opposite directions, reciprocating rakes, part operating in one bowl and part in the other, those operating in one bowl balancing those operating in the other, attached to the same rock-shaft, substantially as described.

4. The combination of the bowl A with the separate bowl A', the bowl A being provided with rakes which move the wool in the liquid in the bowl at the time the rakes provided for the bowl A' are out of the liquid in it, substantially as described.

5. The combination of the shaft K, provided with the segmental gears $j\ j'$, the pinion $o$, the pinion $s$, the shaft O, the gear-wheels R R', which engage with the racks $d\ d'$, the bars $t\ t$, and the rock-shafts $e\ e'$, provided with the rakes B B' and levers $h\ h'$, substantially as described.

6. The combination of a bowl containing a scouring-liquid, a driving-shaft, and suitable intermediate mechanism, with a rake, whereby the rake is given a movement forward through the liquid in the tank parallel with the surface of the liquid, and taken from and returned to the bowl by a movement substantially perpendicular to such forward movement, as and for the purpose set forth.

H. W. CHURCH.

Witnesses:
LEPINE C. RICE,
N. P. OCKINGTON.